United States Patent [19]

Kupres

[11] Patent Number: 4,651,676

[45] Date of Patent: Mar. 24, 1987

[54] SILICONE MILKING UNIT

[76] Inventor: Steven J. Kupres, 923 Plainview Ter., Lake Mills, Wis. 53551

[21] Appl. No.: 804,587

[22] Filed: Dec. 4, 1985

[51] Int. Cl.$^4$ ............................................. A01J 5/08
[52] U.S. Cl. ............................... 119/14.47; 119/14.49
[58] Field of Search ............... 119/14.47, 14.48, 14.49, 119/14.5, 14.51, 14.52, 14.53

[56] References Cited

U.S. PATENT DOCUMENTS

| | | | |
|---|---|---|---|
| 870,785 | 11/1907 | Jacques | 119/14.47 |
| 2,935,964 | 5/1960 | Pickavance et al. | 119/14.47 |
| 3,659,557 | 5/1972 | Noorlander | 119/14.36 |
| 4,116,165 | 9/1978 | Arrington | 119/14.47 |
| 4,332,215 | 6/1982 | Larson | 119/14.49 |
| 4,459,938 | 7/1984 | Noorlander | 119/14.49 |

Primary Examiner—Hugh R. Chamblee
Attorney, Agent, or Firm—Fuller, Puerner & Hohenfeldt, S.C.

[57] ABSTRACT

Disclosed herein is a teat cup assembly for use with a silicone liner. The one piece shell for the teat cup assembly has an integral peripheral protecting wall which projects beyond the end of the cylindrical shell wall and forms a recess for receiving the cuff of the liner. The flange protects the end of the inflation from damage caused by impact with the floor or other articles in the milking parlor. No mechanical parts are required to maintain the liner and assembly in the shell.

2 Claims, 1 Drawing Figure

U.S. Patent  Mar. 24, 1987  4,651,676
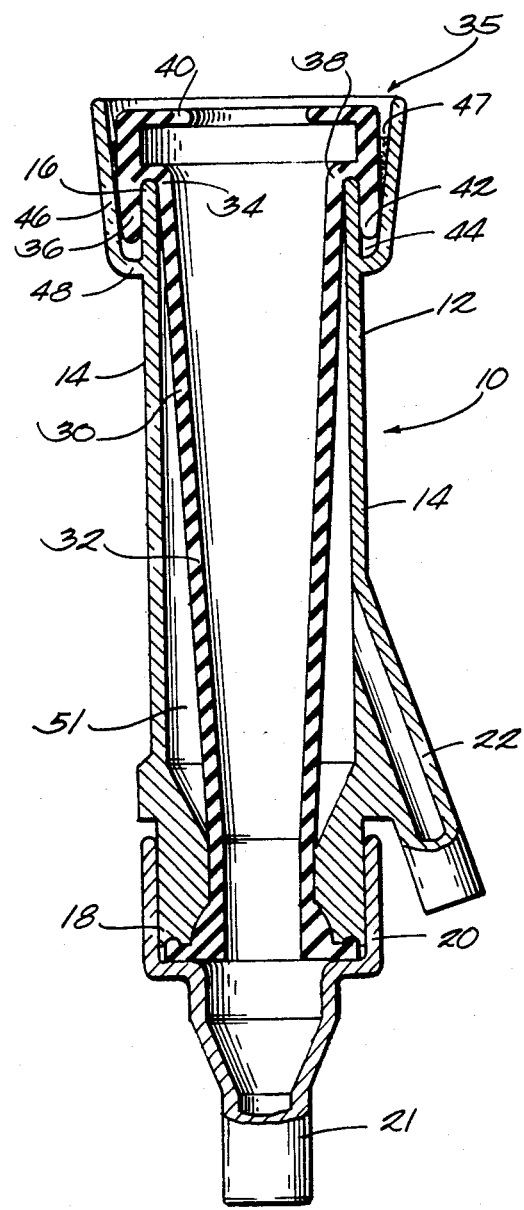

SILICONE MILKING UNIT

BACKGROUND OF THE INVENTION

The invention relates to teat cup assemblies employing a silicone inflation or liner with an outer shell. Use of silicone inflations or liners rather than natural or synthetic rubber is known to be desirable. An article in New Zealand Journal of Dairy Science and Technology, 12.238-241, 1977, discusses the advantages of use of silicone as compared to teat cup liners made from synthetic or natural rubber. Basically the silicone inflations or liners do not absorb butter fat and oils or moisture as do the rubber liners. Additionally, silicone has resistance to extremes of temperature, ability to retain its flexibility even at low temperatures and good resistance to sunlight, oils, solvents and other chemicals. However, the silicone does have certain disadvantages and the commercial silicone teat cup liners suffer from these disadvantages. Silicone has a low tear resistance and is easily punctured. This problem is noted as the primary disadvantage of silicone liners in the above-cited New Zealand article. In the art silicone inflations have been developed to fit existing shells designed for rubber inflations and very little attention has been devoted to developing a shell adapted to protect the silicone inflation. In one prior art device made by BouMatic the distal end of the liner is exposed to impact and can be damaged by a variety of impacts for example, hitting the concrete floor, or the grates in the milking parlor, hitting other cups or equipment and even being stepped on by the cow. An impact on the distal end can cause a shearing action of the cap and shell to cause damage. Accordingly, the useful life afforded by the use of silicone which is normally significantly higher than that for a rubber inflation can be shortened considerably by an impact of this character which can split, tear or cause puncturing of the silicone inflation.

U.S. Pat. No. 4,459,938 discloses a teat cup assembly employing a two-piece silicone rubber inflation with an entrance member 20 and inflation 16. A multiple piece shell with a protective cap covers the distal end of the inflation. This patent shows a structure which is difficult to assemble and disassemble and results in hard to clean pockets which can collect dirt.

Other types of shell constructions such as those illustrated in U.S. Pat. Nos. 4,332,215; 4,116,165 and 3,659,557 show shells which afford some protection for the distal end of the liner but require a ring to expand the liner to secure the liner inplace in the shell and to provide a seal. The machine installation process to install the ring can tear the liner if a silicone liner is employed.

SUMMARY OF THE INVENTION

The invention provides a teat cup assembly with a rigid one piece outer shell which has an annular projecting protective flange which is integral with the main body of the shell and which protects the distal end or cuff of the silicone liner from impact damage which can occur with the prior art devices. The disadvantages of the cup type two-piece shells and the ring type shells are eliminated. The invention provides an easy-to-clean, inexpensive one piece teat cup assembly with integral liner and shell.

The protective flange on the shell extends and diverges or tapers outwardly from the cylindrical body to afford a wedging fit of the liner to provide effective sealing of the liner cuff to the shell at the inlet end. The protective flange will also prevent water from collecting between the shell and inflation in the vacuum chamber 48. This engagement also prevents the inflations from twisting, or liner becoming out of alignment, during normal machine use.

Further objects, advantages and features of the invention will become apparent from the Disclosure.

DESCRIPTION OF THE DRAWING

The FIGURE is a sectional view of the teat cup assembly of the invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

A teat cup assembly 10 includes a teat cup shell 12 which has a cylindrical wall portion 14 having a distal end 16 and a proximal end 18 which is adapted to be connected to a connector 20 with a nipple 21 which is connectable to a source of constant vacuum. The shell 12 also includes an integrally formed small diameter pipe 22 which is connectable to a source of pulsating vacuum as is conventional in teat cup assemblies.

The flexible inflation 30 is desirably formed of silicone rubber and includes a generally cylindrical wall portion 32 which forms a longitudinal teat receiving chamber with a distal end 34 and cuff 35 including a spaced annular peripheral wall 36 joined to the cylindrical wall 32 by a connecting web portion 38. The annular wall 36 has an inwardly extending or inturned flange or lip 40. The cuff 35 includes an extension 42 on wall 36 which is a continuation of wall 36 and extends downwardly from the web portion 38 as viewed in the FIGURE. The overall outline of the cuff is similar to that shown in U.S. Pat. No. 4,372,250 for a rubber inflation except the cuff 35 can be wedge shaped. The end extension 42 wedges within the recess 44 formed by the shell protecting wall portion or flange 46 which is connected to the shell by a juncture portion 48. Flange 46 is flared outwardly and projects beyond the distal portion 16 of the shell in an axial direction. The cylindrical wall portion 14 and wall portion 46 define the recess 44 which is ring-shaped and frusto-conical in section. The wedging fit of the cuff 35 in the recess 44 prevents twisting of the liner distal end in the shell. Adhesive can be applied at 47 to secure the inflation in the shell. Use of the integral flange 46 prevents entry of water into the shell during washing which can occur with cap type assemblies.

The protective wall portion 46 provides lateral protection to the cuff 35 of the silicone liner to prevent direct mechanical contact and impact on the silicone liner. This greatly enhances the life of the silicone liner.

I claim:

1. A teat cup for use in an automatic milking system which includes a source of contant vacuum and a source of pulsating vacuum, said teat cup assembly including a teat cup inflation with a proximal and distal end and a teat cup shell with connections on the shell to the said sources of the vacuum and the inflation including the longitudinal teat receiving chamber and a cuff with an inturned flange located above and spaced from said distal end, the improvement wherein said shell has a cylindrical wall portion with a distal end and proximal end, a peripheral protective wall portion integrally joined with said shell on the outside thereof adjacent to the distal end and flaring outwardly and projecting axially beyond said distal end to form an annular frusto-conical, ring-shaped tapered recess receiving the inflation cuff in a sealing press fit and providing a fluid seal between said cylindrical wall portion of said shell and said cuff on said inflation and said protective wall portion preventing direct impact on said cuff.

2. A teat cup for use in an automatic milking system which includes a source of constant vacuum and source of pulsating vacuum, said teat cup assembly including a teat cup inflation having a distal and proximal end and an inturned flange spaced from the distal end and formed of silicone rubber and a teat cup shell with connections on the shell to the said sources of the vacuum and the inflation including the longitudinal teat receiving chamber and a cuff with a flange and a spaced wall portion, the improvement wherein said shell has a cylindrical wall portion with a distal end and proximal end, a peripheral protective wall portion joined with said shell on the outside thereof adjacent the distal end and wall portions spaced from said wall portion and projecting axially beyond said distal end of said inflation to form an annular recess for receiving the flange of the cuff and protecting said cuff from damage.

* * * * *

UNITED STATES PATENT AND TRADEMARK OFFICE
CERTIFICATE OF CORRECTION

PATENT NO. : 4,651,676
DATED : March 24, 1987
INVENTOR(S) : Steven J. Kupres

It is certified that error appears in the above-identified patent and that said Letters Patent is hereby corrected as shown below:

Cover page, left column, lines 2-3, change name and address of inventor from "Steven J. Kupres, 923 Plainview Ter., Lake Mills, Wis. 53551" to ---Reed A. Larson, N7766 Highway 26, Watertown, Wisconsin 53094---.

Signed and Sealed this

Thirty-first Day of March, 1998

Attest:

BRUCE LEHMAN

Attesting Officer

Commissioner of Patents and Trademarks